(12) United States Patent
Harris (10) Patent No.: US 10,358,017 B1
(45) Date of Patent: Jul. 23, 2019

(54) SHIELD FOR ZERO-TURN MOWERS (71) Applicant: William R. Harris, Ocala, FL (US)

(72) Inventor: William R. Harris, Ocala, FL (US)

(*) Notice: Subject to any disclaimer, the term of this patent is extended or adjusted under 35 U.S.C. 154(b) by 0 days.

(21) Appl. No.: 16/184,545

(22) Filed: Nov. 8, 2018

(51) Int. Cl.
*B60J 1/02* (2006.01)
*A01D 34/00* (2006.01)
*A01D 34/64* (2006.01)
*A01D 101/00* (2006.01)

(52) U.S. Cl.
CPC ............. *B60J 1/025* (2013.01); *A01D 34/001* (2013.01); *A01D 34/64* (2013.01); *A01D 2101/00* (2013.01)

(58) Field of Classification Search
CPC ........ A01D 34/001; B60J 1/025; B60J 3/0286
See application file for complete search history.

(56) References Cited

U.S. PATENT DOCUMENTS

| | | | | |
|---|---|---|---|---|
| 2,603,530 A | * | 7/1952 | Jones | B60J 3/0208 160/211 |
| 3,716,975 A | * | 2/1973 | Smith | A01D 34/62 296/78.1 |
| 5,044,685 A | * | 9/1991 | Yang | B60J 3/0208 296/97.6 |
| D658,569 S | * | 5/2012 | Horton | D12/191 |
| 8,528,258 B1 | * | 9/2013 | Perry | B60J 1/025 296/146.15 |
| 9,352,636 B1 | * | 5/2016 | Johnson | B60J 1/20 |
| 2002/0089208 A1 | * | 7/2002 | Mashborn | B60J 1/2011 296/97.1 |
| 2008/0315616 A1 | * | 12/2008 | Wang | B60J 3/0208 296/97.6 |
| 2018/0170455 A1 | * | 6/2018 | Carlson | B60J 7/10 |

\* cited by examiner

*Primary Examiner* — Jason S Morrow
(74) *Attorney, Agent, or Firm* — Massinger Law Offices (57) ABSTRACT

A shielding apparatus for mounting on zero-turn type mowers of the variety having a horizontal cross-member forward of an operator seat and disposed between a pair of longitudinal frame members supporting a cutting deck, the shielding apparatus being comprised of a panel having a lower mount portion and an upper shield portion, the mount portion being mountable to the cross-member such that said shield portion is oriented vertically, perpendicular to the cutting deck. The shield portion is sized, shaped and oriented to substantially blocks debris and insects expelled forwardly and upwardly from beneath the cutting deck of the mower from coming into contact with an operator of the mower. Embodiments of the subject shielding apparatus are adapted for magnetic mounting to the mower.

16 Claims, 7 Drawing Sheets

SHIELD FOR ZERO-TURN MOWERS

FIELD OF THE INVENTION

The subject invention relates to zero-turn lawn mowers, generally, and to an apparatus for shielding operators of such mowers from airborne debris and insects, in particular.

BACKGROUND OF THE INVENTION

A zero-turn lawn mower (often referred to colloquially as a "z-turn" or "ZTR" mower) is a rear engine mounted riding lawn mower with a turning radius that is effectively zero. Zero-turn mowers have become very popular for both residential and commercial use. Three primary reasons for this popularity are the high degree of forward visibility afforded by virtue of having the engine mounted in the rear, and their superior maneuverability and high cutting rates relative to conventional riding mowers. These attributes can together reduce mowing time by up to 50%.

Although z-turn mowers possess many advantages over riding mowers which are front engine driven, they do suffer from one important disadvantage. Because the operator sits in front of the engine above the blade deck, and because z-turns can travel at relatively high speeds, the operator actually rides into airborne grass clippings, leaves, branches, insects, dirt, dust and other particulate matter (together hereinafter referred to as "debris") and which is expelled from beneath the blade deck, as well as insects which spring up from the grass as they flee from the approaching mower. As a result, the operator often becomes covered with the debris and insects. This makes it impractical for operators to wear shorts when mowing which would otherwise be a desirable practice, particularly in warm or hot temperatures which are typically associated with the peak grass growing (and mowing) season.

Heretofore, efforts have been made to contend with airborne debris and insects by creating a barrier between them and the z-turn operator. U.S. Pat. No. 5,331,794, for instance, teaches a mower shield for rear engine driven riding mowers. The shield is essentially a box-like structure having a top panel horizontally mounted between the longitudinal frame members of the mower and extending forward of the cutting deck. Because the panel projects forwardly past the cutting deck it is susceptible to damage such as may occur when the front of the mower comes into close contact with trees, fencing and the like. Moreover, although the center portion of the shield is transparent, the relatively large framing members of the apparatus obstruct the operator's view immediately forward of the mower which is arguably the most important area to have clearly visible. Additionally, the shield is of a fixed width and, therefore, can only be installed between framing members spaced at a specific distance. A myriad of sizes would therefore be required to accommodate mowers of different sizes. Finally, the apparatus only acts as a barrier in the space between the two parallel frame members to which it is attached. It is desirable to have a wider barrier in some circumstances (i.e., one that is wider than the mower's longitudinal framing members.

More recently, another solution to shielding operators of z-turn mowers from airborne debris and insects was described in U.S. Patent Publication No. 2016/0222691 which teaches a folding screen canopy for zero-turn mowers that almost completely surrounds the operator when seated. The canopy is so large, in fact, that it requires the user to open a side panel to gain entry onto the mower. The panel must then be closed to operate the mower. The process is reversed to exit the mower. Because of its size, the apparatus is susceptible to coming into contact with tree branches, hedges and the like. It will also, to a degree, cut down on ventilation which is certainly undesirable in hot conditions.

Accordingly, there is a need for a shielding apparatus for operators of zero-turn mowers that effectively deflects airborne debris and insects away from the the operator, that is not obtrusive in appearance, that does not inhibit mounting and dismounting from the mower, that may easily be installed on most models of zero-turn mowers, and that does not impede operator visibility or extend from the mower in a direction or distance that makes it susceptible to coming into contact with ground objects, tree limbs and the like.

SUMMARY OF THE INVENTION

The subject invention meets the above-described needs in the art by providing an apparatus for shielding the operators of zero-turn mowers from airborne debris and insects. More specifically, embodiments of the shielding apparatus of the subject invention are intended for mounting on zero-turn type mowers of the variety having a horizontal cross-member disposed between a pair of longitudinal frame members forward of the operator when seated on the mower, the cross-member having a flat and substantially vertical front surface, the shielding apparatus being comprised of a preferably transparent or translucent panel having a mount portion mounted to the vertical surface of the cross-member and a shield portion extending vertically from the mount portion, the shield portion having a height of between 20 inches and 28 inches, and preferably between 22 and 26 inches, and a width at least equal to the width of the cross-member. In preferred embodiments, the subject shielding apparatus is magnetically mounted to a ferrous cross-member such that the apparatus may be easily detached from the mower for cleaning and/or when the mower is being transported on an open trailer, for instance. Embodiments of the invention further include a forwardly disposed flange along the top edge of the shield portion of the panel for deflecting generally vertically moving debris and insects away from the operator when the mower is moving forward.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is, therefore, a primary object of the subject invention to provide an accessory apparatus for zero-turn mowers for shielding the operator from airborne insects and debris while mowing.

It is also a primary object of the subject invention to provide such a shielding apparatus for zero-turn mowers that is magnetically mounted and thus capable of rapid mounting and dismounting, and because of its ease of detachment, is less likely to present a tripping hazard relative to fixed-mounted shielding devices of the prior art.

It is another primary object of the subject invention to provide such a shielding apparatus that is substantially free of sharp external angles and corners which could cause injury to an operator while mounting or dismounting from the mower.

Another object of the subject invention is to provide such a shielding apparatus that is manufactured from materials that are durable, UV-resistant and resistant to corrosion, pitting, chipping, crazing and scratching.

Another object of the subject invention is to provide a shielding apparatus that may be manufactured from materials that can be finished or treated to possess a smooth, easily cleanable surface.

Still another object of the subject invention is to provide a shielding apparatus that is easily mountable and removable for cleaning without being disassembled.

Another object of the subject invention is to provide a shielding apparatus which may be produced in a variety of perimeter shapes.

Another object of the subject invention is to provide such a shielding apparatus for zero-turn mowers that is susceptible of a low cost of manufacture with regard to both materials and labor, and which accordingly is then susceptible of low prices of sale to the consuming public, thereby making the device available to a broad range of the buying public.

These together with other objects of the invention, along with the various features of novelty which characterize the invention, are pointed out with particularity in the claims annexed to and forming a part of this disclosure. For a better understanding of the invention, its advantages and the specific objects attained by its uses, reference should be had to the accompanying drawings and descriptive matter in which there is illustrated a preferred embodiment of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENT

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. The figures provided herewith are for explanation purposes to persons ordinarily skilled in the art and that the drawings are not necessarily drawn to scale.

In addition, as used in the following description, any reference to terms of orientation such as "horizontal", "vertical", "front", "rear", "left", "right", "up", "down", "inward" or "outward", "proximate", "distal", as well as adjectival and adverbial derivatives thereof (e.g., "horizontally", "vertically", "forwardly", "rearwardly", "leftward", "rightward", "upward", "downward", "inwardly" or "outwardly"), generally refer to the orientation of a surface or structure relative to its axis of elongation, or axis of rotation, as appropriate. One of ordinary skill in the art will also appreciate that a component may be designed as multiple components or that multiple components may be designed as a single component.

Furthermore, reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "in some embodiments", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

Figure 1:
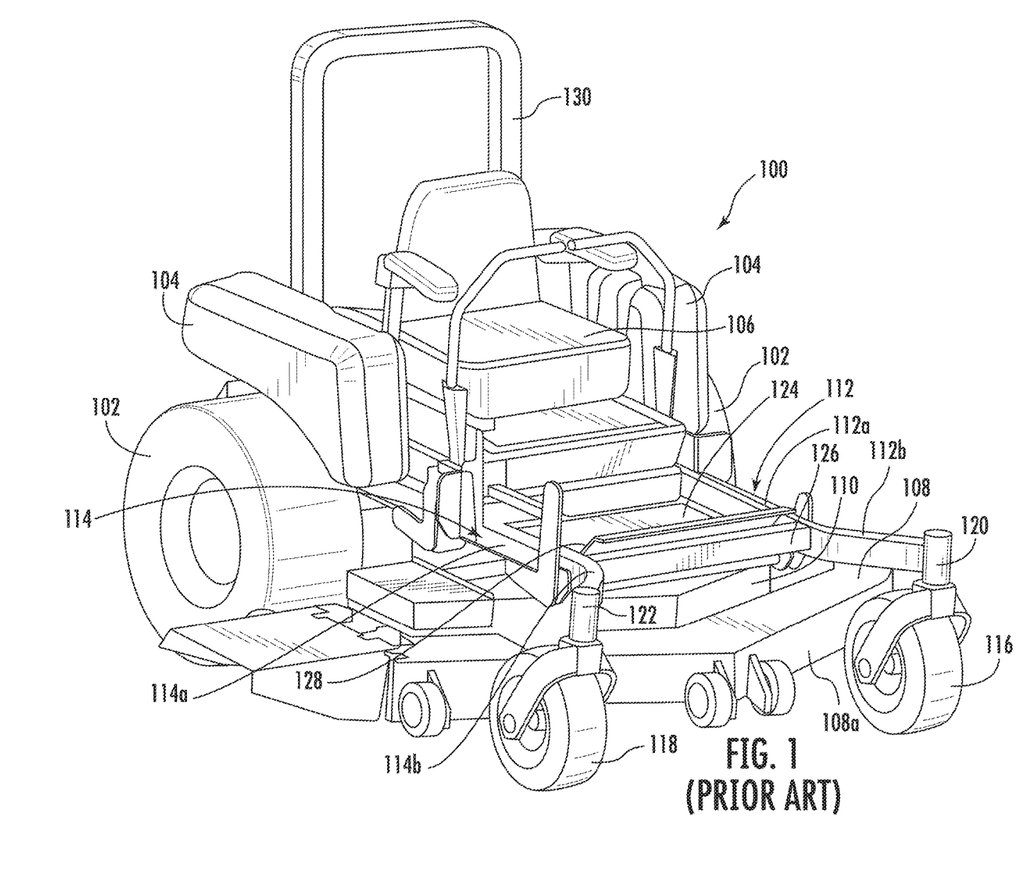
FIG. 1 is a perspective view of typical zero-turn mower to which a shielding apparatus of the subject invention may be mounted.

Before describing the various embodiments of the subject shielding apparatus it is helpful to first describe, very basically, some primary components of zero-turn mowers including those components to which the subject apparatus is intended to be mounted. Accordingly, reference is first made to FIG. 1 in which there is illustrated a typical zero-turn radius lawn mower 100 (hereinafter "z-turn mower") portions of which have been eliminated or simplified when not important to an understanding of the invention. Z-turn mower 100 has a pair of rear drive wheels 102 on each side of the vehicle that are powered to rotate independently of one another. A framing structure supports at a minimum, the engine (not shown), one or more fuel tanks 104, an operator seat 106, a cutting deck 108 having a leading edge 108*a*, and a pulley and belt system housing 110 located above cutting deck 108. The framing structure includes left and right longitudinal frame members 112,114 supported on a forward end by front castor wheels 116,118. Each longitudinal frame member 112,114 includes a straight portion 112*a*,114*a* in parallel with one another and an outwardly flared portion 112*b*,114*b* terminating in wheel bearings 120,122. An operator foot platform 124 is disposed between straight portions 112*a*,114*a* of longitudinal frame members 112,114, respectively, and includes foot rest 128. Foot platform 124 is located forward of seat 106 and rearward of a horizontal frame member 126 which is transversely disposed between longitudinal frame members 112, 114. Foot rest 128 depends from foot platform 124 upwardly and forwardly at an angle of approximately 45 degrees. Most commercial z-turn mowers, and some residential models, include a safety roll bar 130.

Figure 5:
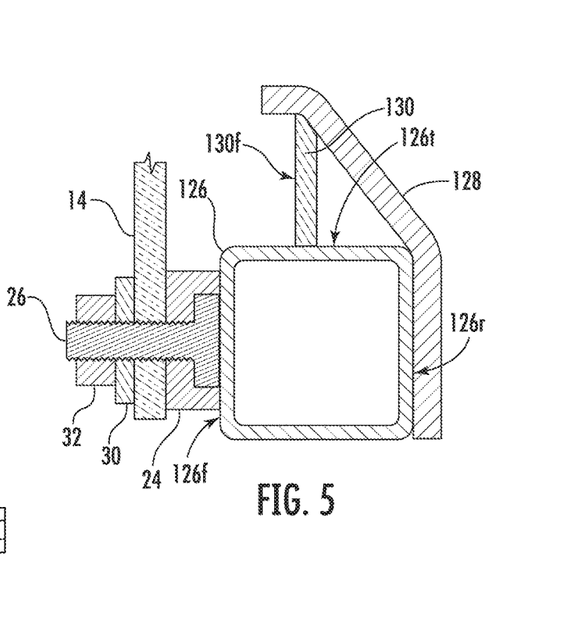
FIG. 5 is an enlarged sectional view of the mount portion of the shielding apparatus of FIG. 3 mounted to a cross-member of a zero-turn mower.

With additional reference now being made to FIG. 5, horizontal frame member 126 is typically made of square ferrous metal tubing, typically painted, and includes a flat vertical front face 126*f*, a horizontal top surface 126*t* and a flat vertical rear face 126*r*. Depending on the manufacturer and model of the mower, foot rest 128 may be in abutting (if not fixed) engagement with front face 126*f* and/or top surface 126*t* of horizontal frame member 126, and in some instances (as shown) may be supported by a transverse support 130 having a flat vertical front face 130*f*. Some z-turn mowers include a pivotable jack (not shown) mounted to the front face 126*f* of horizontal frame member 126 in parallel fashion when the jack is in its stowed position. The jack is used to elevate the front end of the mower off the ground for the purpose of servicing the cutting blades and is typically includes a length of square metal tubing having a flat vertical front face substantially similar to that of horizontal frame member 126.

Reference is now made to FIGS. 2-5 in which there is illustrated a first embodiment of a shielding apparatus of the subject invention. Hereinafter, all embodiments of the subject shielding apparatus for zero-turn mowers shall be referred to more simply as "shielding apparatus" and are designated generally by reference numeral 10. All embodiments of shielding apparatus 10 are adapted for mounting to any fixed (i.e. non-operable) structure of a zero-turn mower entirely or substantially forward of the foot platform 124 and entirely or substantially rearward of the leading edge 108*a* of cutting deck 108. In some embodiments, shielding apparatus 10 is adapted for magnetic mounting to any flat and substantially vertical ferromagnetic metal surface forward of the foot platform 124 and rearward of the leading edge 108*a* of cutting deck 108, especially including, but not limited to, any of the heretofore described horizontal frame member 126, transverse support 130 or jack (when in its horizontal stowed position), each individually a "cross-member" and all collectively "cross-members." In all cases, shielding apparatus 10 will be perpendicular to cutting deck 108 and perpendicular to the parallel portions of longitudinal frame members 112,114.

More specifically, embodiments of the shielding apparatus 10 of the subject invention are intended for mounting on zero-turn type mowers of the variety having a horizontal cross-member disposed transversely between a pair of longitudinal frame members, and especially such zero-turn mowers wherein the cross-member is made of a ferromagnetic material and has a flat, substantially vertical front surface. An example shielding apparatus 10 of the subject invention is comprised of a substantially vertically oriented panel 12, preferably but not essentially planar in cross-section and rectangular in shape; panel 12 comprising a mount portion 14 (in one embodiment represented by the area below dotted line 14*a*) for mounting, directly or through an intermediary structure, to a cross-member of a z-turn mower 100, and a shield portion 16 preferably but not essentially in coplanar relationship with mount portion 14 and having a size and shape sufficient to substantially shield an operator seated on mower 100 from contact with airborne debris and insects emanating from the ground in front of mower 100 as it travels in a forward direction. Most often, the airborne debris and insects will be that which are expelled from beneath the mower cutting deck, and in the case of insects those which leave the ground as the mower comes into close proximity to them during the cutting operation.

In an example embodiment shown in FIGS. 2-5, mount portion 14 has a height approximately equal to that of a standard horizontal frame member 126, namely approximately 2 inches. In an example embodiment shown in FIGS. 2-5, mount portion 14 has a width less than or equal to the length of horizontal frame member 126 which typically is between approximately 18 inches and 24 inches.

Figure 7:
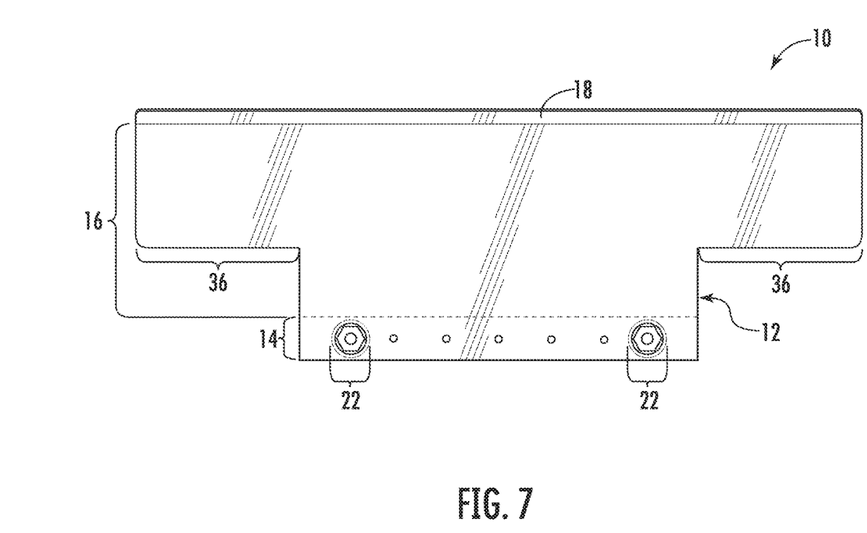
FIG. 7 is a front elevation view of a T-shaped embodiment of a shielding apparatus of the subject invention.
Figure 8:
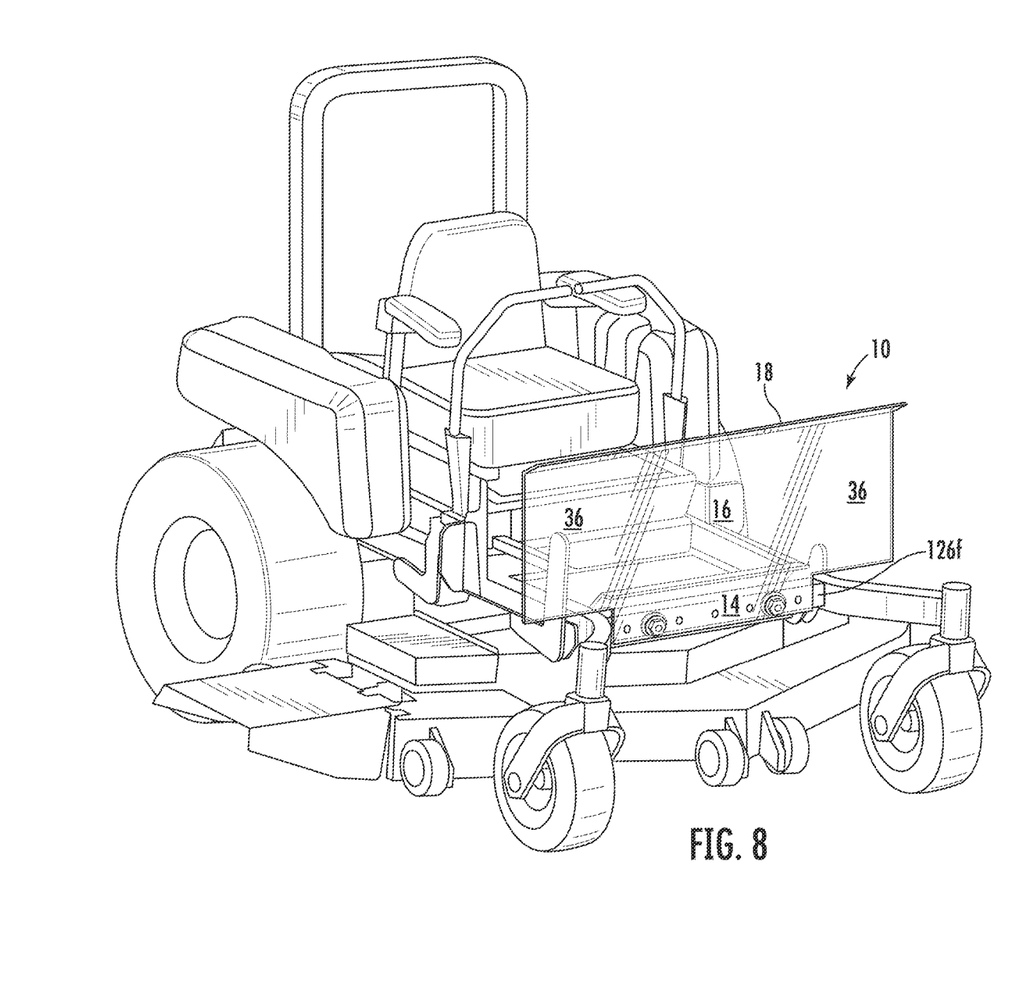
FIG. 8 is a perspective view of the T-shaped shielding apparatus of FIG. 7 shown mounted to a zero-turn mower.

Shield portion 16 has a height ranging from between 20 inches and 30 inches, and preferably between 22 inches and 28 inches. Shields within this height range have been proven adequate to shield an operator's head, neck and upper torso from a majority of airborne debris and insects dispelled from the front of the mower deck even though the shield itself is lower than these body parts of the operator. This is likely because such airborne debris and insects do not have sufficient time to reach a height greater than the top of shielding apparatus 10 before coming into contact with shield portion 16 as mower 100 travels in the forward direction. Shield portion 16 has a width ranging from between 24 inches and 36 inches, with 34 inches being optimal. In the embodiments illustrated in FIGS. 2-5, shield portion 16 has a width equal to that of mount portion 14 which in turn is equal to the length of the cross-member to which shielding apparatus 10 is mounted. In other embodiments such as illustrated in FIGS. 7-8, shield portion 16 is wider than mount portion 14 as described infra.

Preferred embodiments of the subject shielding apparatus 10 further include a forwardly angled flange 18 depending from top edge 20 of shield portion 16 of panel 12 for deflecting away from the operator airborne debris and insects in front of the mower 100 when the mower is moving forward. This is useful for airborne Flange 18 is angled between 1 degree and 90 degrees relative to panel 12 with an angle of 45 degrees being preferred. As should be understood, flange 18 may, in addition to being characterized as an extension of shielding portion 16, be considered a part of shielding portion 16.

Panel 12 and flange 18 are preferably of plexi-glass, but may be of other suitable transparent or translucent plastic, such as polycarbonate or tempered glass. While not preferred, panel 12 could also be made of other materials including those that are opaque.

Figure 2:
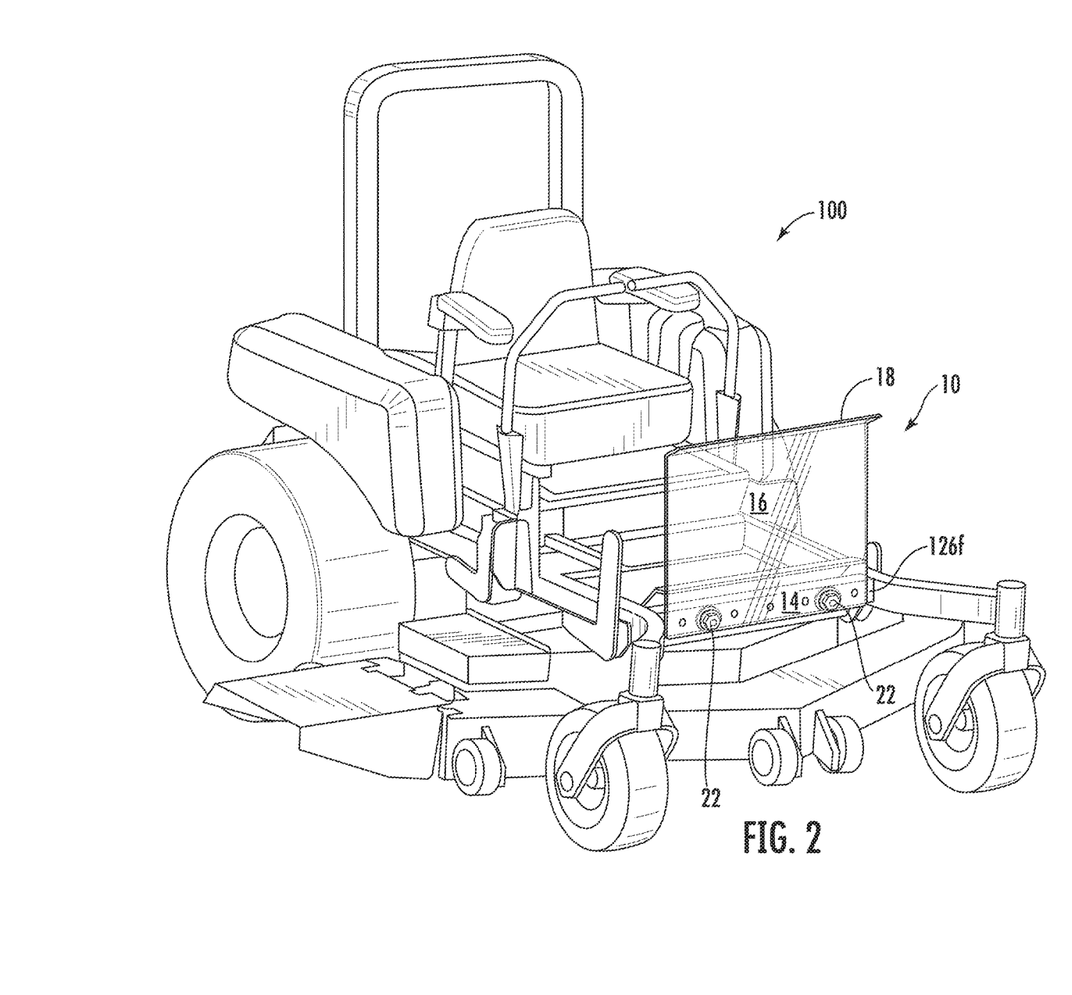
FIG. 2 is a perspective view of the zero-turn mower of FIG. 1 having a first embodiment of a shielding apparatus of the subject invention mounted thereto.
Figure 3:
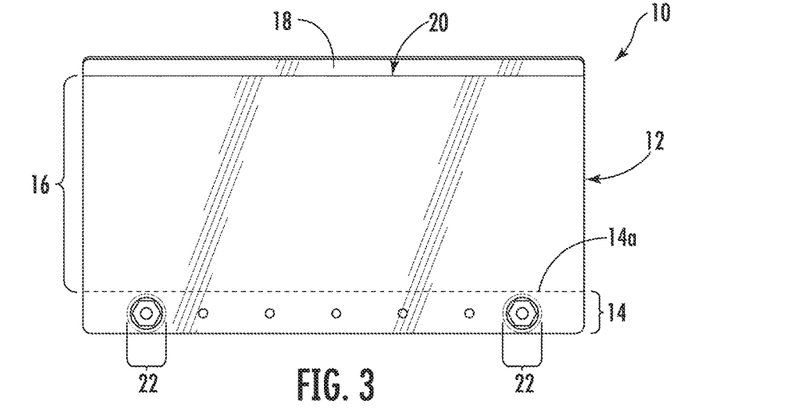
FIG. 3 is a front elevation view of an embodiment of the subject shielding apparatus.
Figure 4:
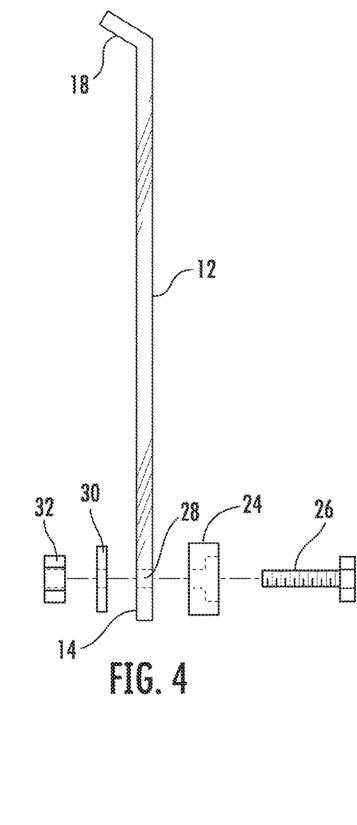
FIG. 4 is a left side view of the shielding apparatus of FIG. 3.
Figure 6:
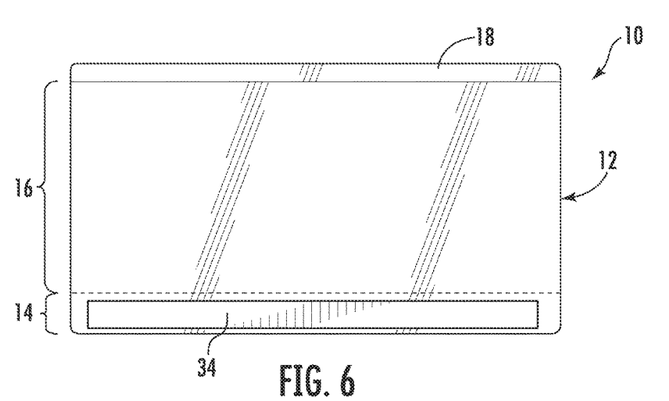
FIG. 6 is a rear elevation view of an embodiment of the subject shielding apparatus having a magnetic strip applied to its mount portion.

The subject shielding apparatus 10 further includes mounting means for removably attaching the apparatus to a zero-turn mower. While mounting of the subject apparatus to a cross-member of the mower is preferred, those skilled in the art will recognize that the apparatus may be adapted for mounting to other mower structures located between the operator seat and leading edge of the cutting deck, including to the longitudinal frame members. In a preferred embodiment, shielding apparatus 10 is magnetically mounted to the front vertical surface of a ferromagnetic cross-member. As illustrated in FIGS. 2, 5 and 8 the cross-member may be horizontal frame member 126. As illustrated in FIGS. 3-5, magnetic mounting hardware 22 may include, by way of example only, at least two magnets 24 mounted to mount portion 14 of panel 12 each with a carriage bolt 26 disposed through one of a plurality of apertures 28 spaced incrementally along mount portion 14 and secured using washers 30 and nuts 32. Magnets 24 are of a strength sufficient to securely mount panel 12 on the cross-member. As may be appreciated, more than one magnet may be disposed on each bolt. Those skilled in the art will also recognize that magnets 24 may alternatively be mounted on the front side of mount portion 14, or on both front and back sides thereof. Magnets 24 are preferably countersunk to receive the head of bolts 26, particularly when the magnet is disposed between panel 12 and the cross-member. In an alternate embodiment (FIG. 6), a magnetic strip 34 is permanently fixed to the back of mount portion 14, substantially across its width using either an adhesive or double-sided tape, for instance. As may be appreciated, a plurality of smaller magnetic strips could also be utilized.

Mounting of shielding apparatus 10 to a cross-member is accomplished by positioning magnets 24 (or one or more magnetic strips as described above) in proximity to the vertical surface of the cross-member. The attraction is instantaneous and the removal is similarly instantaneous by simply tilting panel 12 forward to break the field of force. Embodiments of the subject shielding apparatus 10 take advantage of Rare Earth Magnets or Neodymium (NEFEM). This material has a strength 100 times greater than steel magnets, while its size is very dramatically reduced. The field of force is so concentrated and powerful that a {fraction $(1/10)\}^{th}$-oz. disc magnet of Neodymium can hold more than 30 times its weight. Capitalizing on these advantages allows a very small and light holding system for panel 12 to be removably attached to the cross-member, in a very simple and rapid manner. The reversal of this simple installation procedure removes panel 12 and makes it available for use thousands of times. Magnets 24 may be plated with Nickel, chrome or the like, and/or encased in plastic, to avoid any atmospheric deterioration.

Turning now to FIGS. 7 and 8, an embodiment of shielding apparatus 10 is comprised of a substantially vertically oriented and T-shaped panel 12, preferably but not essentially planar in cross-section; panel 12 comprising a mount portion 14 for mounting, directly or through an intermediary structure, to a cross-member of a z-turn mower 100, and a shield portion 16 in coplanar relationship with mount portion 14 and having a size and shape sufficient to substantially shield an operator seated on mower 100 from contact with airborne debris and insects generally in front of mower 100 as it travels in a forward direction. Note in this embodiment that mount portion has a width less than that of shield portion 16. More specifically, mount 14 is sized for removable attachment to the front vertical surface 126f of a horizontal frame member 126 between left and right longitudinal frame members 112,114 and, thus, has a width less than or equal to the distance between them. Shield portion 16 extends upwardly from mount portion 14. In this embodiment, at least a portion of shield portion 16 extends laterally (outwardly) over longitudinal frame members 112,114 in the form of what may be characterized as left and right lateral shield extensions 36. Lateral shield extensions 36 affectively widen panel 12 to afford a greater area of protection from airborne debris and insects. As with embodiments previously described, the shielding apparatus 10 of FIGS. 7 and 8 may further include a forwardly angled flange 18 across the top edge of panel 12, including across the top of shield portion 16 lateral shield extensions 36.

Figure 9:
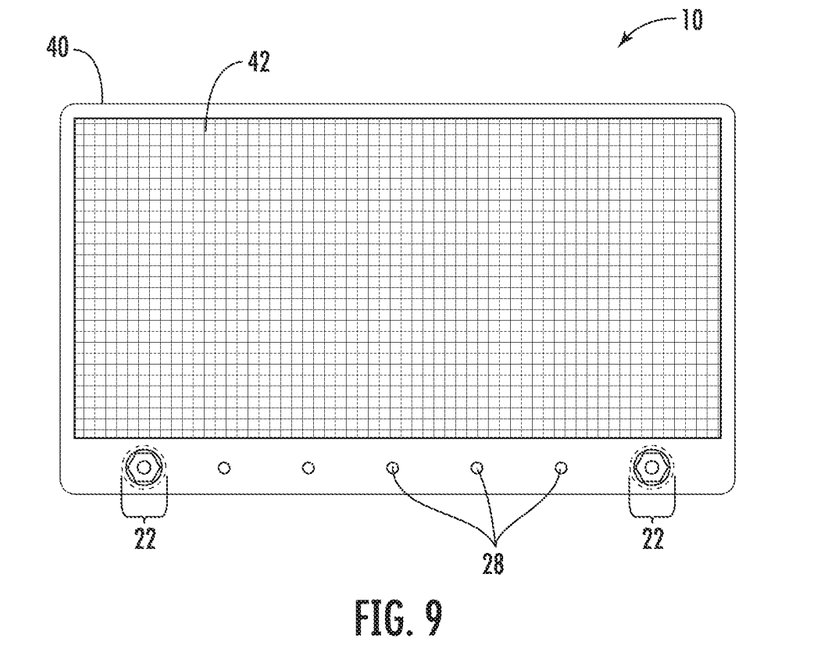
FIG. 9 is a front elevation view of an embodiment of a shielding apparatus of the subject invention comprising a frame and screen.

Referring to FIG. 9, an alternate embodiment of a shielding apparatus 10 of the subject invention is comprised of a rectangular frame 40 made of plastic, metal or other suitable material and a screen 42 mounted within frame 40. Screen 42 has a density sufficient to prevent the passage of insects, cut grass and other similarly sized debris and is made of a tear-resistant material such as vinyl-coated polyester. Shielding apparatus 10 further includes mounting hardware 22 for mounting frame 40 to one of the heretofore described mounting surfaces of zero-turn 100.

Figure 10:
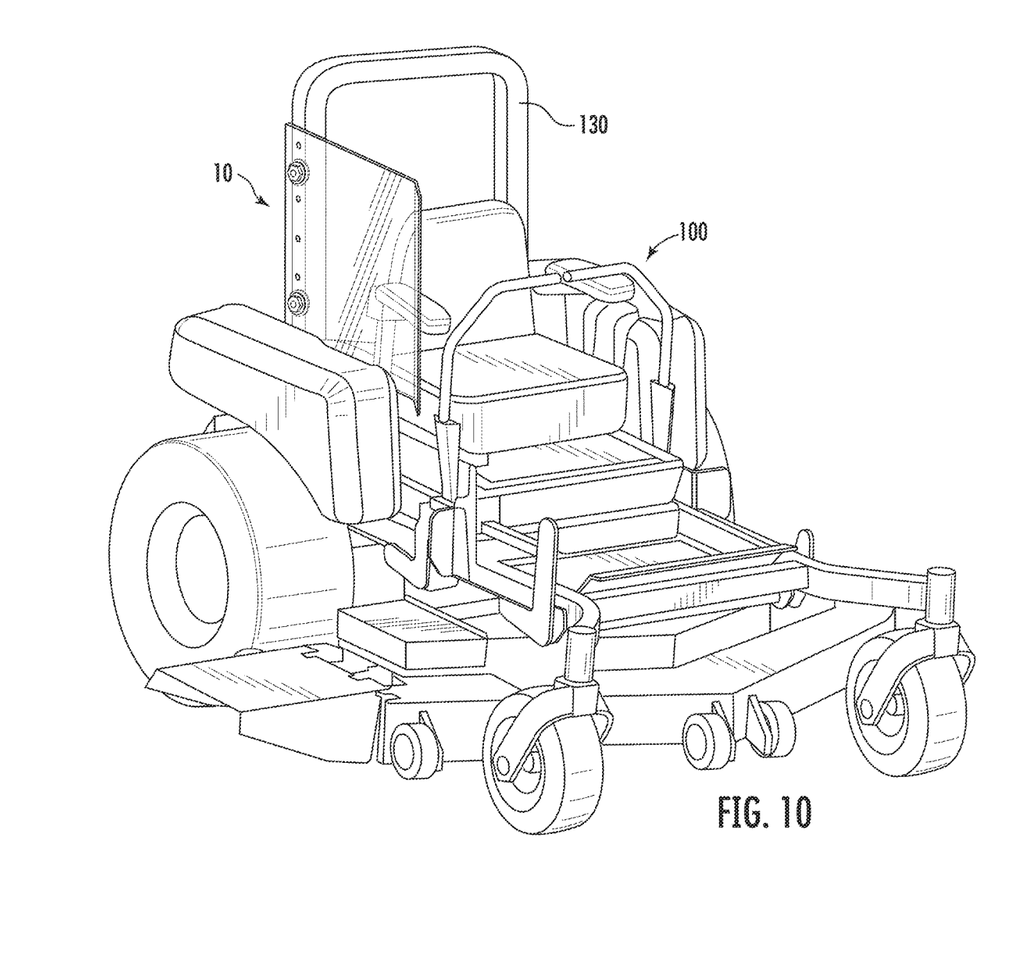
FIG. 10 is a perspective view of a shielding apparatus of the subject invention shown magnetically mounted to the roll bar of a zero-turn mower.

As may be readily appreciated, all of the above-described embodiments of shielding apparatus 10 may be easily detached from the mower 100 for cleaning and/or when the mower is being transported on an open trailer, for instance. Zero-turn mowers often need to be transported on open trailers. In order to mitigate against unintended dismounting of the subject shielding apparatus 10 from the mower 100 such as may occur when panel 12 is exposed to high wind speeds, shielding apparatus may be magnetically mounted on roll bar 130 so that panel 12 is parallel to the direction of travel as shown in FIG. 10. Alternatively, shielding apparatus 10 may be magnetically mounted to the metal framing of the trailer or stowed in the towing vehicle.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed as being new, useful and desired to be protected by Letters Patent of the United States is as follows:

1. In a zero-turn type mower of the variety having a horizontal cross-member forward of an operator seat and disposed between a pair of longitudinal frame members supporting a cutting deck having a leading edge, the improvement comprising a panel having a mount portion and a co-planar shield portion, said mount portion being removably mounted to the cross-member or longitudinal frame members such that said shield portion is oriented vertically and above said mount portion, perpendicular to the cutting deck, between the seat and the leading edge of the cutting deck, whereby the shield portion substantially blocks debris and insects expelled from beneath the cutting deck of the mower from coming into contact with an operator of the mower.

2. The improved zero-turn mower of claim 1, wherein said shield portion has a height of between 22 inches and 30 inches, and a width of between 24 inches and 36 inches.

3. The improved zero-turn mower of claim 1, wherein the cross-member is ferromagnetic and has a flat and substantially vertical front surface, and further including at least one magnet mounted to said mount portion of said panel and having a magnetic strength sufficient to removably secure said panel to the vertical front surface of the cross-member such that said shield portion extends upwardly from the cross-member.

4. The improved zero-turn mower of claim 3, wherein the cross-member is ferromagnetic and has a flat and substantially vertical front surface, and further including at least one magnet mounted to said mount portion of said panel and having a magnetic strength sufficient to removably secure said panel to the vertical front surface of the cross-member such that said shield portion extends upwardly from the cross-member.

5. The improved zero-turn mower of claim 4, wherein said shield portion has a top horizontal edge and flange depending at an angle from said top horizontal edge.

6. The improved zero-turn mower of claim 4, wherein said shield portion has a top horizontal edge and flange depending at an angle from said top horizontal edge.

7. The improved zero-turn mower of claim 3, wherein said panel is T-shaped.

8. The improved zero-turn mower of claim 4, wherein said panel is T-shaped.

9. The improved zero-turn mower of claim 1, wherein said shield portion is transparent or translucent.

10. The improved zero-turn mower of claim 2, wherein said shield portion is transparent or translucent.

11. The improved zero-turn mower of claim 3, wherein said shield portion is transparent or translucent.

12. The improved zero-turn mower of claim 4, wherein said shield portion is transparent or translucent.

13. The improved zero-turn mower of claim 5, wherein said shield portion is transparent or translucent.

14. The improved zero-turn mower of claim 6, wherein said shield portion is transparent or translucent.

15. The improved zero-turn mower of claim 7, wherein said shield portion is transparent or translucent.

16. The improved zero-turn mower of claim 8, wherein said shield portion is transparent or translucent.

\* \* \* \* \*